US012557780B1

(12) United States Patent
Xiao

(10) Patent No.: US 12,557,780 B1
(45) Date of Patent: Feb. 24, 2026

(54) PET FEEDING DISH

(71) Applicant: Zhouchi Xiao, Shenzhen (CN)

(72) Inventor: Zhouchi Xiao, Shenzhen (CN)

( * ) Notice: Subject to any disclaimer, the term of this patent is extended or adjusted under 35 U.S.C. 154(b) by 0 days.

(21) Appl. No.: 19/360,681

(22) Filed: Oct. 16, 2025

(51) Int. Cl.
*A01K 5/01* (2006.01)

(52) U.S. Cl.
CPC ................................. *A01K 5/0114* (2013.01)

(58) Field of Classification Search
CPC .. A01K 5/0114; A01K 39/00; A01K 39/0113; A01K 39/01; A01K 63/006; A01K 61/80; A01K 31/12; A01K 13/004
See application file for complete search history.

(56) References Cited

U.S. PATENT DOCUMENTS

| 1,390,611 | A | * | 9/1921 | Haisley | ................ | A01K 13/004 |
| | | | | | | 119/658 |
| 2,964,011 | A | * | 12/1960 | Hall | ..................... | A01K 13/004 |
| | | | | | | D30/158 |

| 8,082,883 | B2 | * | 12/2011 | Aletti | ..................... | B66F 11/00 |
| | | | | | | 119/61.57 |
| 2018/0084758 | A1 | * | 3/2018 | Zhu | ..................... | A01K 15/024 |
| 2025/0280789 | A1 | | 9/2025 | Zhang | | |

FOREIGN PATENT DOCUMENTS

| CN | 205671228 | U | * | 11/2016 | ........... | A01K 15/024 |
| CN | 106342719 | A | * | 1/2017 | ............. | A01K 39/01 |
| CN | 107853208 | A | * | 3/2018 | ........... | A01K 15/024 |
| DE | 102006006189 | B3 | * | 6/2007 | ........... | A01K 5/0114 |

* cited by examiner

*Primary Examiner* — Monica L Perry
(74) *Attorney, Agent, or Firm* — Nitin Kaushik

(57) ABSTRACT

Disclosed is a pet feeding dish. The pet feeding dish includes a feeder body and a climbing column standing in the feeder body. The climbing column includes an upper climbing column and a lower climbing column. The upper climbing column and the lower climbing column are movably assembled through helical structures to adjust a height of the climbing column. The pet feeding dish of the present application has a flexible applicability.

12 Claims, 12 Drawing Sheets

1

PET FEEDING DISH

TECHNICAL FIELD

The present application relates to a field of pet supplies, and in particular to a pet feeding dish.

BACKGROUND

Pets are creatures that people keep for spiritual purposes rather than for economic purposes. Conventionally, the pets are mammals or birds that are kept for fun and accompanying. In actual life, the pets include fish, reptiles, amphobians, insects, and even plants, and kept for pleasure, accompanying, and living mental stress of human beings.

When keeping the pets, it is necessary to regularly provide food. In order to improve an active state of the pets, small reptiles are usually provided for the reptiles in the pets to feed on. However, directly placing the small reptiles in a pet box may cause the small reptiles to crawl around and affect environment in the pet cage.

In addition, pet feeding dishs in the related art have a fixed volume and cannot be adjusted according to the feeding amount or the size of the pet cage.

Therefore, it is necessary to provide a pet feeding dish to solve at least one of the above-mentioned problems.

SUMMARY

The present application is to provide a pet feeding dish. A pet feeding dish includes:
a feeder body; and
a climbing column standing in the feeder body, the climbing column including:
an upper climbing column; and
a lower climbing column,
wherein the upper climbing column and the lower climbing column are movably assembled through helical structures to adjust a height of the climbing column.

In an embodiment, each of the upper climbing column and the lower climbing column includes an outer side wall provided with an outer helical structure; and one of the upper climbing column and the lower climbing column includes an inner side wall provided with an inner helical structure, and the inner helical structure is cooperated with the outer helical structure of the other of the upper climbing column and the lower climbing column.

In an embodiment, the pet feeding dish further includes at least one branch structure extending outward from an outer side wall of the climbing column.

In an embodiment, the at least one branch structure is integrally formed with the climbing column.

In an embodiment, an end of each of the at least one branch structure is provided with a pair of clamping feet, an helical structure on the outer side wall of the climbing column defines a helical groove, at least one pair of clamping slots are formed on side walls of the helical groove, and each of the at least one branch structure is detachably mounted on the outer side wall of the climbing column through the cooperation of the pair of clamping feet and the at least one pair of clamping slots.

In an embodiment, an end of each of the at least one branch structure is provided with a mounting block having a non-circular profile, the climbing column is provided with a non-circular mounting hole that matches the mounting block in both size and shape, and each of the at least one branch structure is detachably mounted on the outer side wall of the climbing column through the cooperation of the mounting block and the non-circular mounting hole.

In an embodiment, the pet feeding dish further includes an anti-escape umbrella-like structure covering a top of the upper climbing column, the anti-escape umbrella-like structure including:
a top area; and
an edge area surrounding the top area, and extending outward and downward from the top area, wherein an outer edge of the edge area surrounds the outer side wall of the upper climbing column.

In an embodiment, the anti-escape umbrella-like structure is fixedly connected to the top of the upper climbing column, a lower side of the anti-escape umbrella-like structure abutting against an entire outer edge of the top of the upper climbing column.

In an embodiment, the anti-escape umbrella-like structure includes an upper petal structure and a lower petal structure stacked in a staggered manner.

In an embodiment, each of the upper petal structure and the lower petal structure includes a top area and an edge area extending outward and downward from the top area.

In an embodiment, the edge area of each of the upper petal structure and the lower petal structure includes a plurality of petal-shaped members, with a gap defined between every two adjacent petal-shaped members.

In an embodiment, each petal-shaped member of the upper petal structure is aligned with a gap of the lower petal structure, and each gap of the upper petal structure is aligned with a petal-shaped member of the lower petal structure.

The pet feeding dish provided in the present application have at least one of the following advantages:
1. by arranging a climbing member in the pet feeding dish, the activity space for small reptiles is expanded, the probability of the small reptiles crawling around inside the pet cage is reduced, and both the vitality of small reptiles and the environment are improved;
2. the height of the climbing member is adjustable, allowing the users to adjust the height of the climbing member according to the number of small reptiles or the size of the pet cage, which makes the application of the pet feeding dish more flexible;
3. the arrangement of the branch structure(s) further expands the activity space of the small reptiles and further enhances the activity level of the small reptiles;
4. an anti-escape umbrella-like structure is arranged at the top of the climbing member to prevent small reptiles with strong jumping ability from jumping out as much as possible, the anti-escape umbrella-like structure adopts a flower shape, which makes the overall appearance of the pet feeding dish more appealing.

DETAILED DESCRIPTION OF THE EMBODIMENTS

Figure 1:
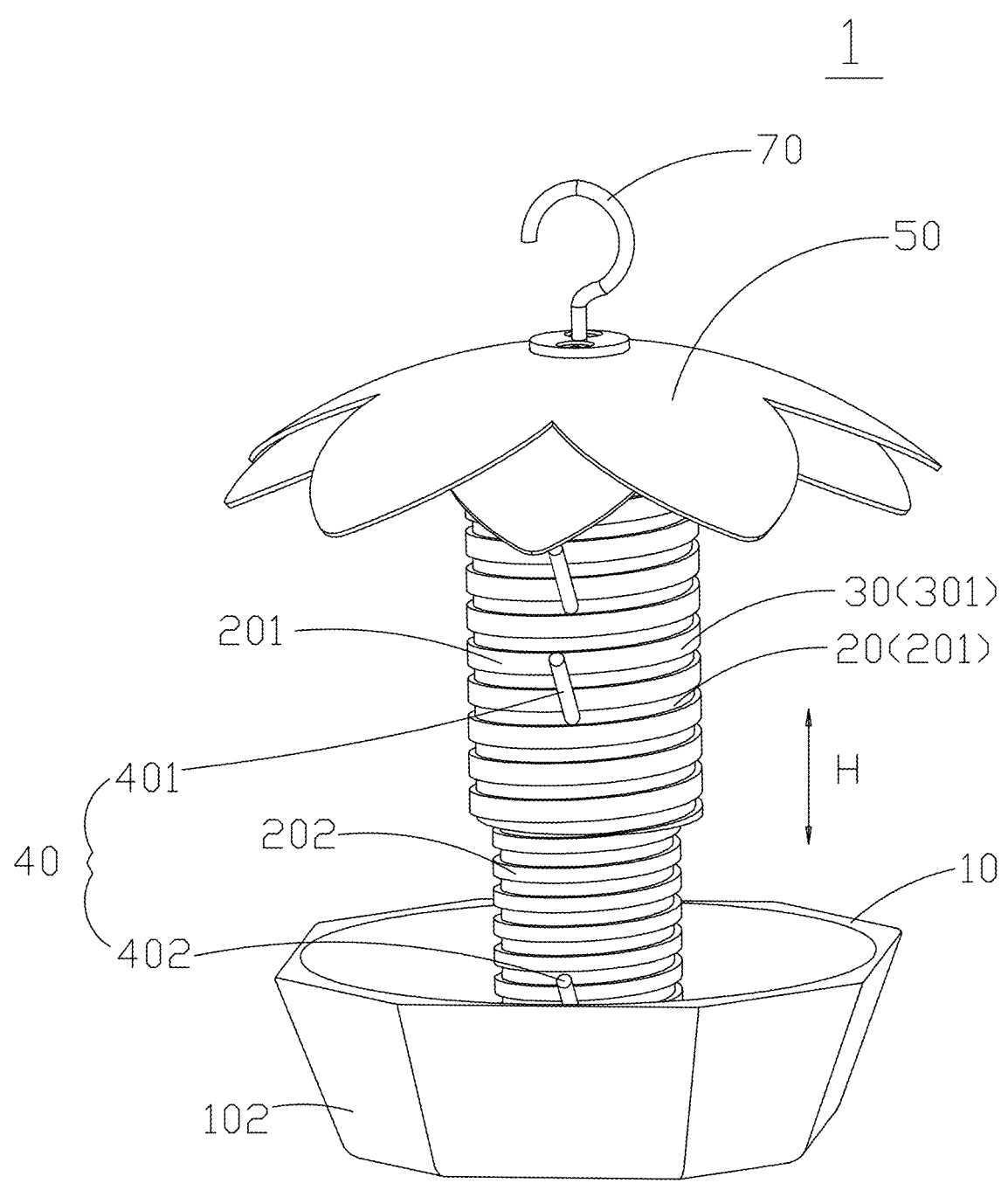
FIG. 1 is a schematic structural view of a pet feeding dish according to a first embodiment of the present application.
Figure 2:
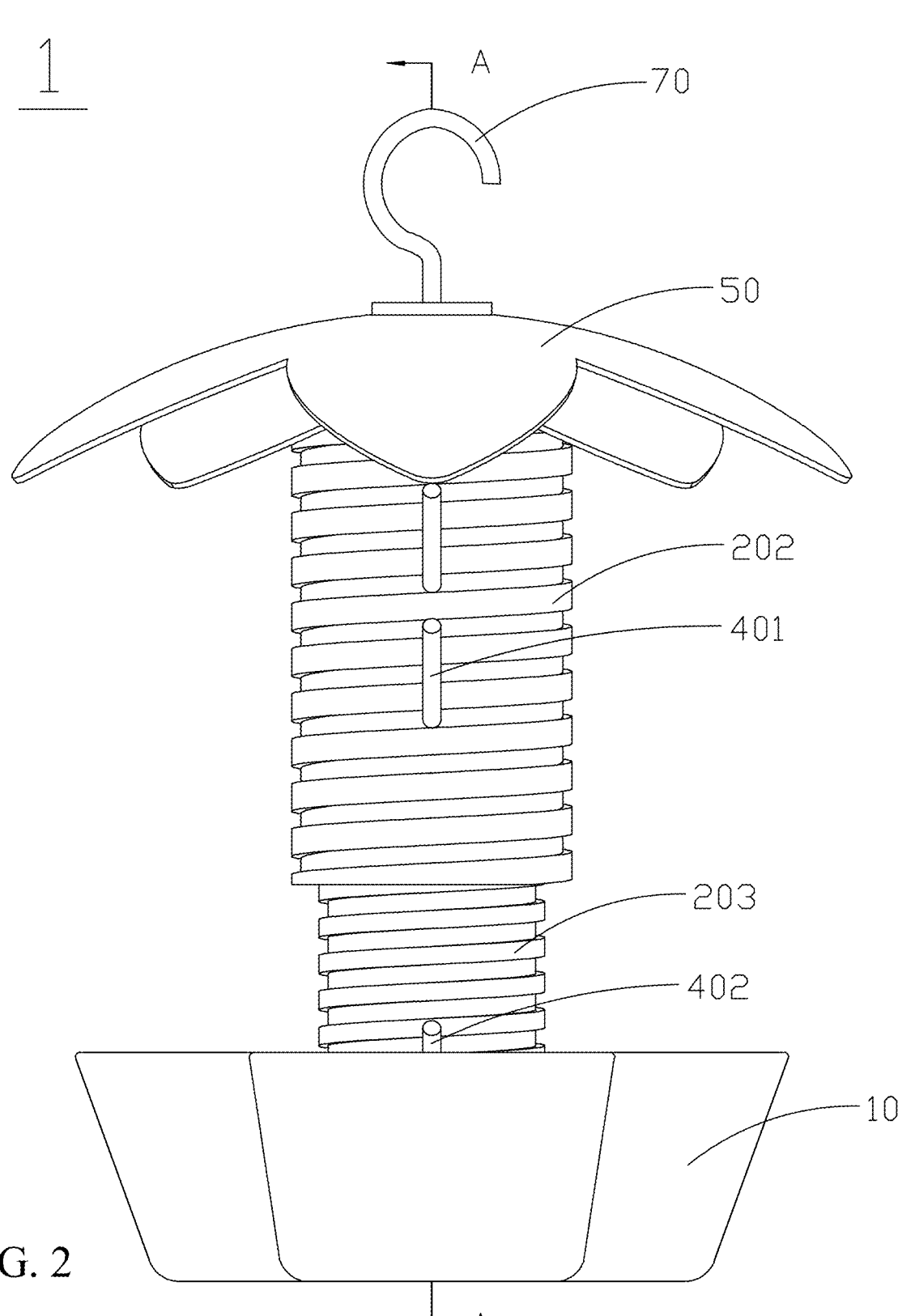
FIG. 2 is a schematic structural view of the pet feeding dish of FIG. 1, taken from another perspective.

The present application will be further described in detail below with reference to the FIGS. 1-12.

Referring to FIGS. 1 to 4, a pet feeding dish according to a first embodiment of the present application includes a feeder body 10. The feeder body 10 includes a bottom plate 101 and protective plates 102, and the protective plates 102 are integrally formed with the bottom plate 101 or mounted along a circumferential direction of the bottom plate 101. Shapes of the protective plates 102 are not limited herewith, and the protective plates 102 are configured to limit small reptiles to climb anywhere and reduce the probability of the small reptiles crawling out of the feeder body 10. A climbing member 20 for the small reptiles to climb on is detachably disposed in a center area 103 of the feeder body 10. A climbing part 30 is provided on an outer surface of the climbing member 20 and makes the outer surface of the climbing member 20 to be rougher, facilitating the small reptiles to climb along a height direction of the climbing member 20. After the feeder body 10 is placed in a pet cage and the small reptiles are placed inside the feeder body 10, the feeder body 10 can contain the small reptiles and the small reptiles are restricted by the feeder body 10, which reduces the probability of the small reptiles crawling around in the pet cage and improves the environment of the pet cage. The climbing member 20 further expands the activity space for the small reptiles, so as to maintain the vitality of the small reptiles.

In the present embodiment, the climbing member 20 is a climbing column 201 mounted on the bottom plate 101 and stands on the bottom plate 101. The climbing part 30 is one or more helical structures 301 provided on the climbing column 201.

In the present embodiment, the climbing column 201 includes an upper climbing column 202 and a lower climbing column 203 along a height direction H of the climbing column 201. The upper climbing column 202 has a larger diameter, while the lower climbing column 203 has a smaller diameter. The upper climbing column 202 is a hollow cylindrical structure with an opening 2022 provided at a lower end 2021. The upper climbing column 202 is sleeved on the lower climbing column 203 through the opening 2022. An inner helical structure 2024 is arranged on an inner side wall 2023 of the upper climbing column 202, and an outer helical structure 2026 is arranged on an outer side wall 2025 of the upper climbing column 202. An outer helical structure 2032 is arranged on an outer side wall 2031 of the lower climbing column 203. The outer helical structure 2032 cooperates with the inner helical structure 2024 to assemble the upper climbing column 202 and the lower climbing column 203 in a detachable and movable manner. Rotating the upper climbing column 202 relative to the lower climbing column 203 can selectively make the upper climbing column 202 rise or fall along the lower climbing column 203, thereby adjusting the overall height of the climbing column 201. Thus, users can adjust the height of the climbing column 201 according to the number of reptiles placed in the feeder body 10 or the size of the pet cage.

In the present embodiment, outer helical structures are provided on the outer side walls of the upper climbing column 202 and the lower climbing column 203. These outer helical structures roughen the outer surface of the climbing column 201, thereby facilitating the reptiles' climbing. Meanwhile, the outer helical structure 2032 on the outer side wall 2031 of the lower climbing column 203 can also cooperate with the inner helical structure 2024 on the inner side wall 2023 of the upper climbing column 202 to adjust the height of the climbing column 201, allowing the users to set the climbing column 201 to a suitable height based on specific needs.

In the present embodiment, the lower climbing column 203 is a solid cylindrical structure. In another embodiment, however, the lower climbing column 203 may alternatively be a hollow cylindrical structure.

In the present embodiment, the upper climbing column 202 is a hollow cylindrical structure. In another embodiment, at least a lower section of the upper climbing column 202 is a hollow cylindrical structure.

The climbing column 201 is provided with at least one branch structure 40, and the at least one branch structure 40 is extended outward from the outer side wall of the climbing column 201.

Referring to FIG. 1, in the present embodiment, there are a plurality of branch structures 40, and the branch structures 40 include branch structures 401 distributed on the upper climbing column 202 and branch structures 402 distributed on the lower climbing column 203. The branch structures 401 extend outward from the outer side wall 2025 of the upper climbing column 202, and the branch structures 402 extend outward from the outer side wall 2031 of the lower climbing column 203. In the present embodiment, the branch structures 401 and the upper climbing column 202 are integrally formed by injection molding, and the branch structures 402 and the lower climbing column 203 are also integrally formed by injection molding.

Projections of the branch structures 401 and 402 in the vertical direction fall within the feeder body 10.

Figure 5:
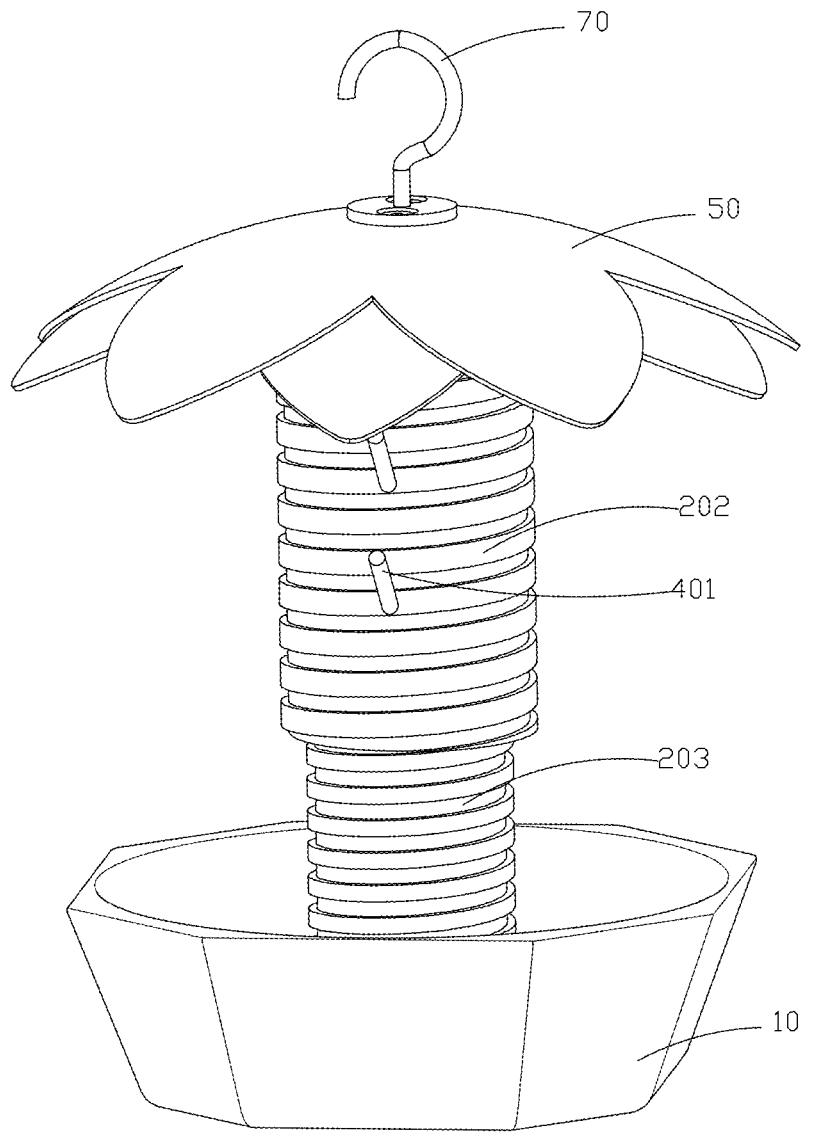
FIG. 5 is a schematic structural view of a pet feeding dish according to a second embodiment of the present application.

Referring to FIG. 5, FIG. 5 is a schematic structural view of the pet feeding dish according to a second embodiment of the present application. In the second embodiment, the upper climbing column 202 is provided with the branch structures 401, while the lower climbing column 203 is not provided with any branch structures.

Figure 6:
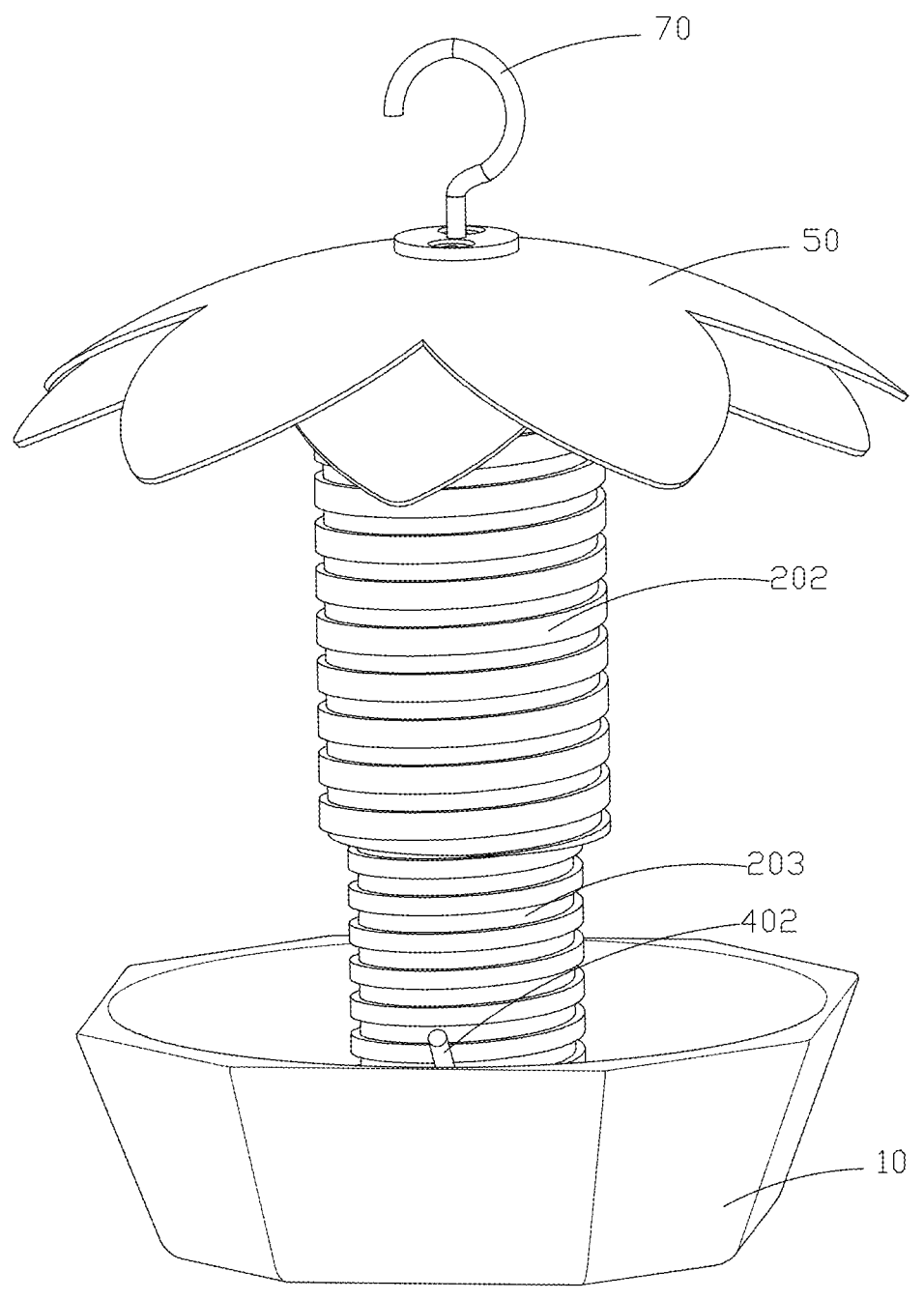
FIG. 6 is a schematic structural view of a pet feeding dish according to a third embodiment of the present application.

Referring to FIG. 6, FIG. 6 is a schematic structural view of the pet feeding dish according to a third embodiment of the present application. In the third embodiment, the lower climbing column 203 is provided with the branch structures 402, while the upper climbing column 202 is not provided with any branch structures.

Figure 7:
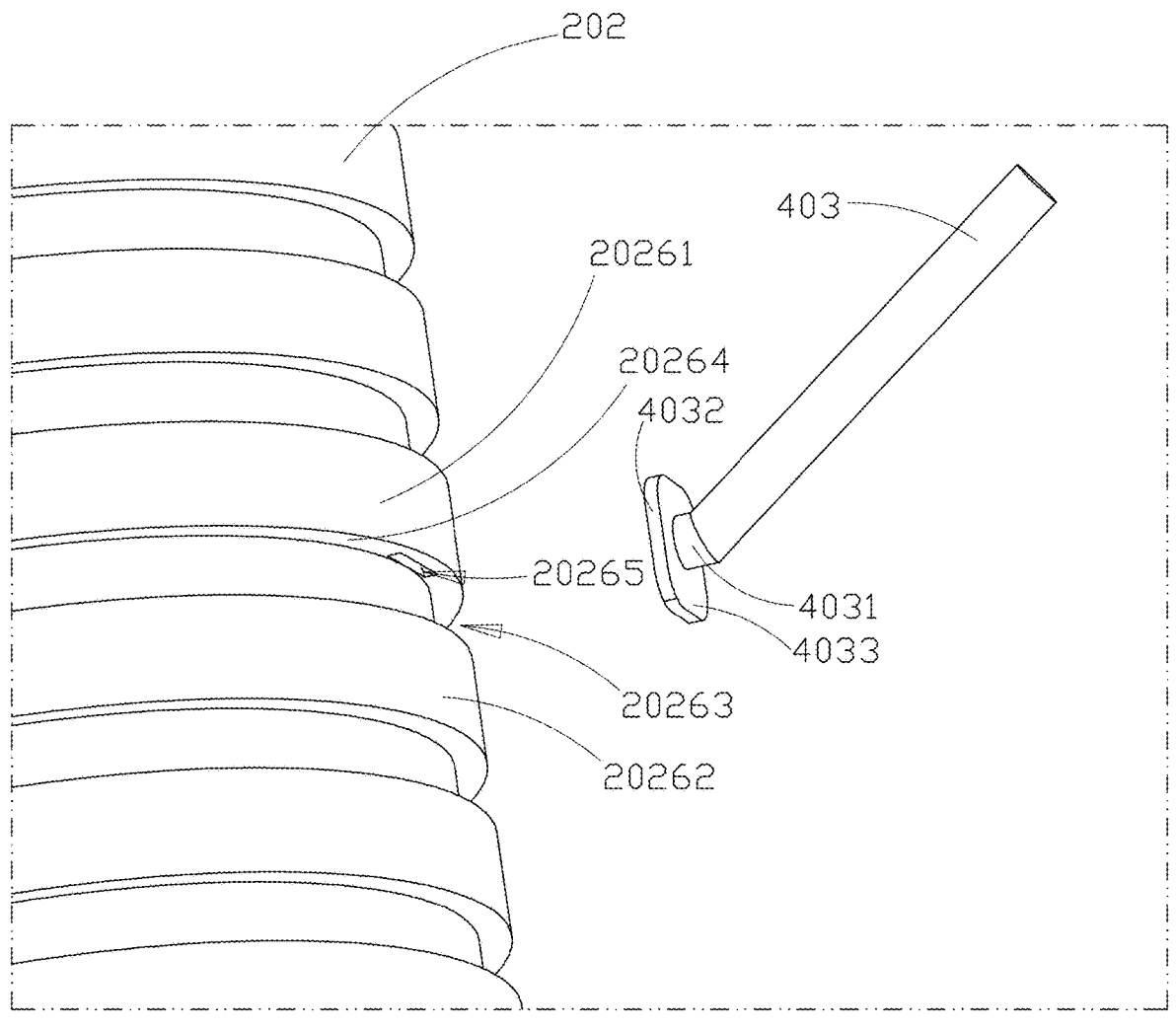
FIG. 7 is a partial schematic view of a pet feeding dish according to a fourth embodiment of the present application, with a branch structure separated from a climbing column.

Referring to FIG. 7, FIG. 7 is a schematic structural view of the pet feeding dish according to a fourth embodiment of the present application. In the fourth embodiment, each branch structure 403 is assembled to the climbing column 202 through a mounting structure. In the following, one of the branch structures 403 on the upper climbing column 202 is taken as an example for detailed description. One end 4031 of the branch structure 403 is connected with a sheet member 4032, and the sheet member 4032 includes a pair of clamping feet 4033 arranged on opposite sides of the end 4031 correspondingly and serving as the mounting structure. The outer helical structure 2026 on the upper climbing column 202 includes an upper helical protrusion section 20261 and a lower helical protrusion section 20262 adjacent to the upper helical protrusion section 20261. A helical groove 20263 is formed between the upper helical protrusion section 20261 and the lower helical protrusion section 20262. At least one pair of clamping slots 20265 are formed on two side walls 20264 of the helical groove 20263. The pair of clamping feet 4033 can be clamped into one of the at least one pair of clamping slots 20265 to fix the branch structure 40 to the upper climbing column 202. When there are multiple pairs of clamping slots 20265 distributed along the helical groove 20263, the users can fix a branch structure 403 at any desired position, as well as fix multiple branch structures 403 to the upper climbing column 202.

It can be understood that the branch structures 403 can be mounted on the lower climbing column 203 in the same manner, which will not be repeated here. The branch structures 40 expands the activity space for the small reptiles and enhances their vitality.

Figure 8:
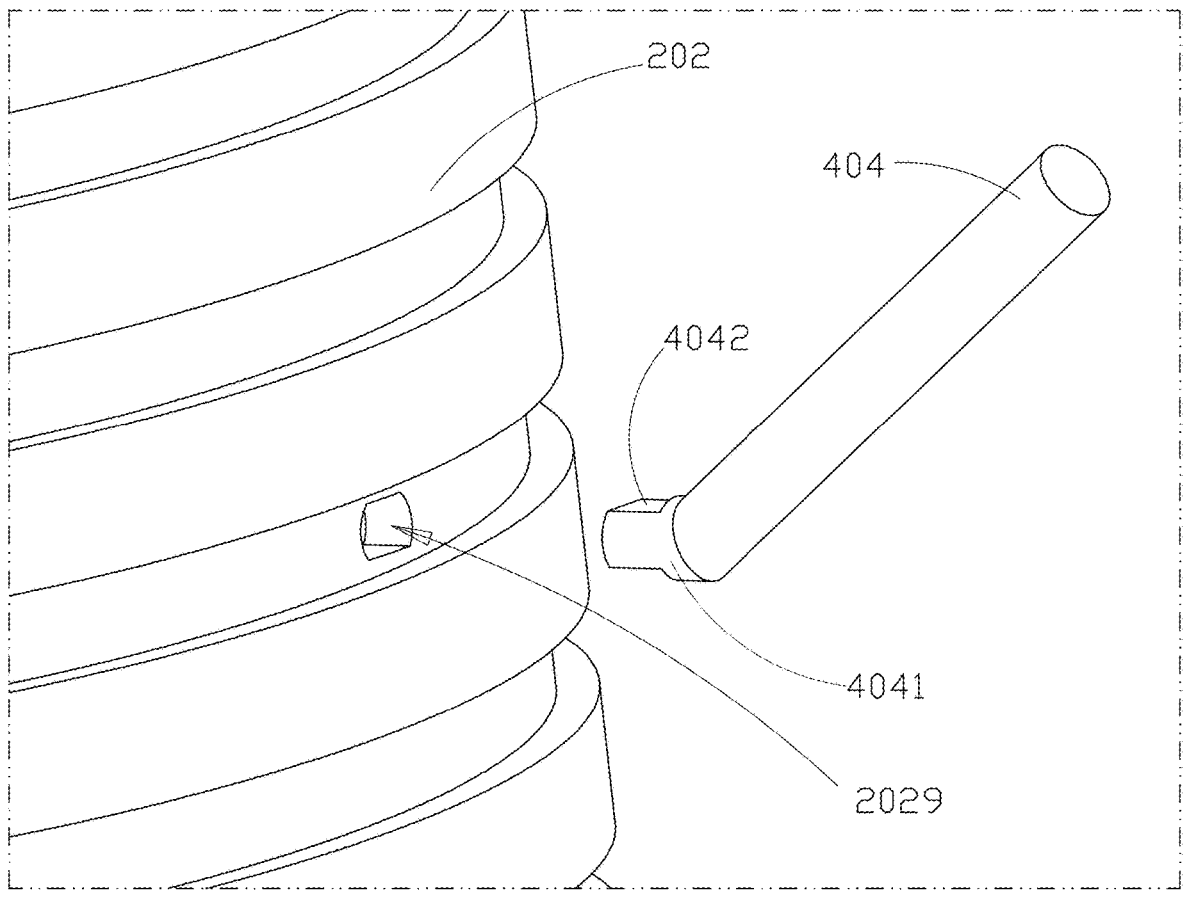
FIG. 8 is a partial schematic view of a pet feeding dish according to a fifth embodiment of the present application, with a branch structure separated from a climbing column.
Figure 9:
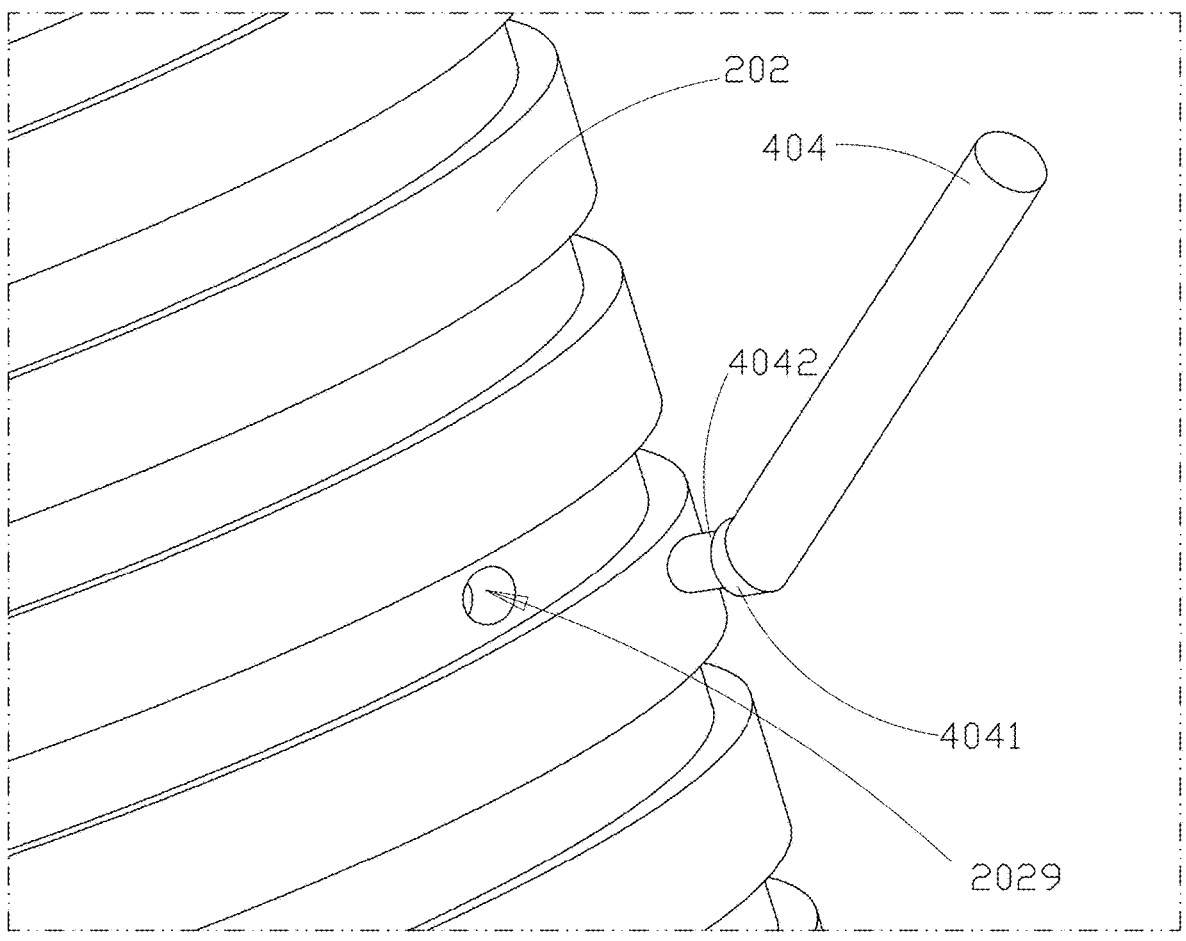
FIG. 9 is a partial schematic view of a pet feeding dish according to a sixth embodiment of the present application, with a branch structure separated from a climbing column.
Figure 10:
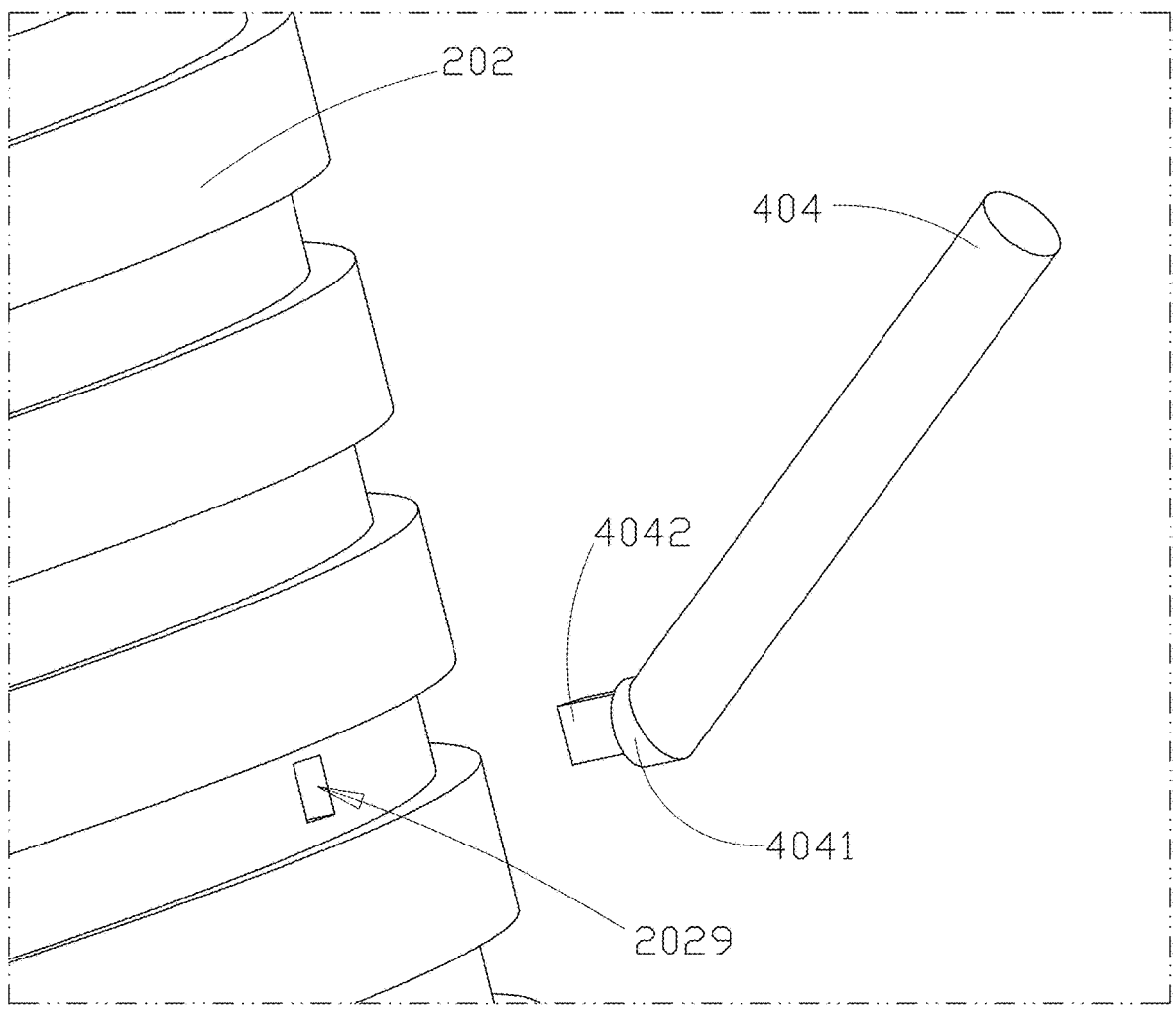
FIG. 10 is a partial schematic view of a pet feeding dish according to a seventh embodiment of the present application, with a branch structure separated from a climbing column.
Figure 11:
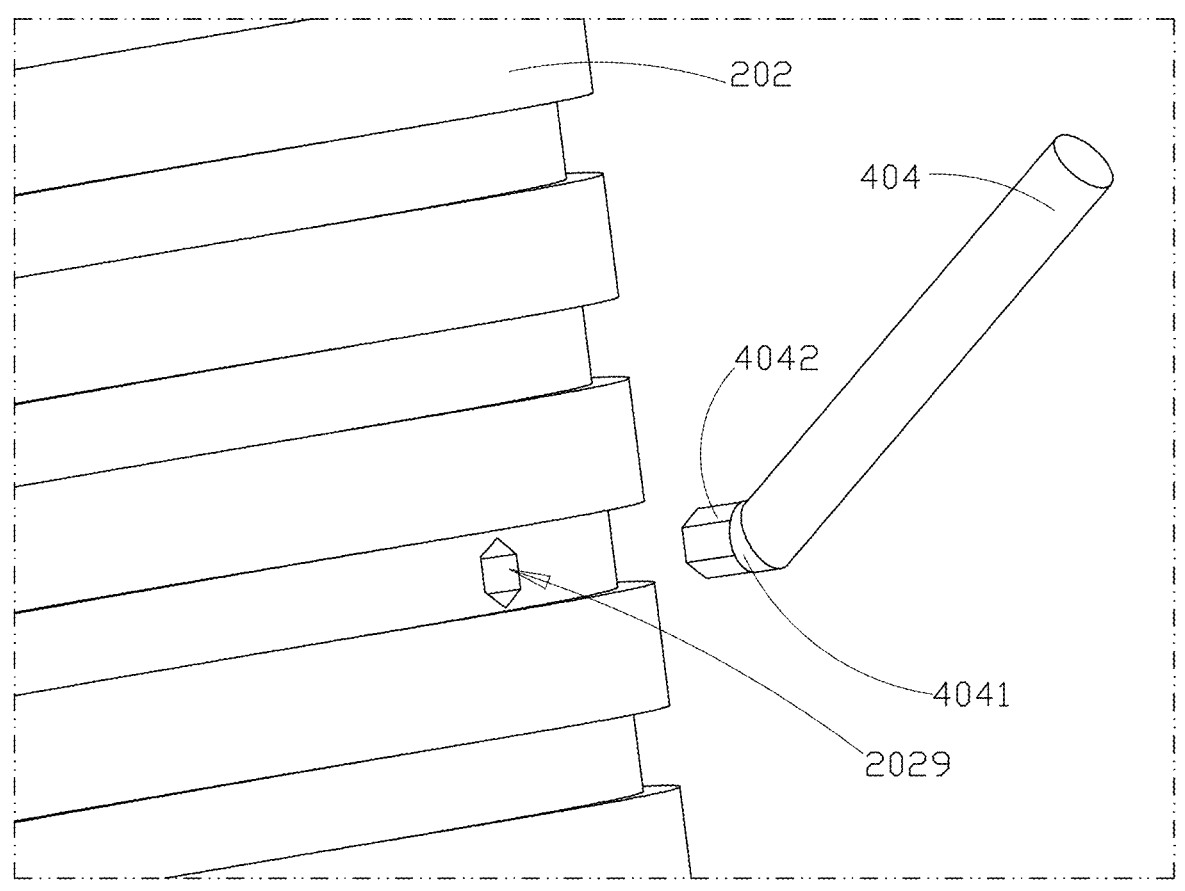
FIG. 11 is a partial schematic view of a pet feeding dish according to an eighth embodiment of the present application, with a branch structure separated from a climbing column.

Referring to FIGS. 8-11, according to fifth to eighth embodiments of the present application, each branch structure 404 is mounted on the climbing column 201 by means of a mounting structure. For the following description, one of the branch structures 404 on the upper climbing column 202 is still taken as an example for detailed description. One end 4041 of the branch structure 404 is provided with a mounting block 4042. The mounting block 4042 has a non-circular profile and serves as the mounting structure. Examples of the non-circular profile include an obround contoured profile (as shown in FIG. 8), an elliptical contoured profile (as shown in FIG. 9), and a polygonal contoured profile (as shown in FIGS. 10-11). Correspondingly, the upper climbing column 202 is provided with a non-circular mounting hole 2029 that matches the mounting block 4042 in both size and shape. For example, the hole 2029 may be an obround hole (as shown in FIG. 8), an elliptical hole (as shown in FIG. 9), or a polygonal hole (as shown in FIGS. 10-11). The branch structure 404 is mounted and secured on the climbing column 202 by inserting the mounting block into the non-circular mounting hole 2029.

Referring back to FIG. 3, an anti-escape umbrella-like structure 50 is provided on a top 2027 of the upper climbing column 202 and covers the top 2027 of the upper climbing column 202. In an embodiment, the anti-escape umbrella-like structure 50 is fixedly connected to the upper climbing column 202 by threaded connecting members 60. In an embodiment, threaded holes 20271 are formed on the top 2027 of the upper climbing column 202, while threaded holes 502 are formed in a top area 501 of the anti-escape umbrella-like structure 50, with the two sets of threaded holes aligned one to one. The threaded connecting members 60 are screwed into the threaded hole 502 and the threaded hole 20271 to mounted the anti-escape umbrella-like structure 50 on the top 2027 of the upper climbing column 202. An inner side 506 of the anti-escape umbrella-like structure 50 abuts against an entire outer edge 2028 of the top 2027 of the upper climbing column 202, thus preventing the small reptiles from crawling into the gap between the anti-escape umbrella-like structure 50 and the top 2027 of the upper climbing column 202. The threaded connecting members 60 can be nut-and-threaded rod assemblies or bolts.

In the present embodiment, the anti-escape umbrella-like structure 50 includes two stacked petal structures 500. Each petal structure 500 includes a central top area 501 and an edge area 503 surrounding the top area 501. The edge area 503 extends outward and downward from the top area 501, and an outer edge 5031 of the edge area 503 surrounds the outer side wall 2025 of the upper climbing column 202. The edge area 503 includes a plurality of petal-shaped members 504, with a gap 505 formed between every two adjacent petal-shaped members 504. The two petal structures 500 are stacked in a staggered manner, that is, petal-shaped members 504a of the upper petal structure 500a are aligned with gaps 505b of the lower petal structure 500b, while gaps 505a of the upper petal structure 500a are aligned with petal-shaped members 504b of the lower petal structure 500b. The upper petal structure 500a and the lower petal structure 500b are fixed together by gluing or other means.

Figure 3:
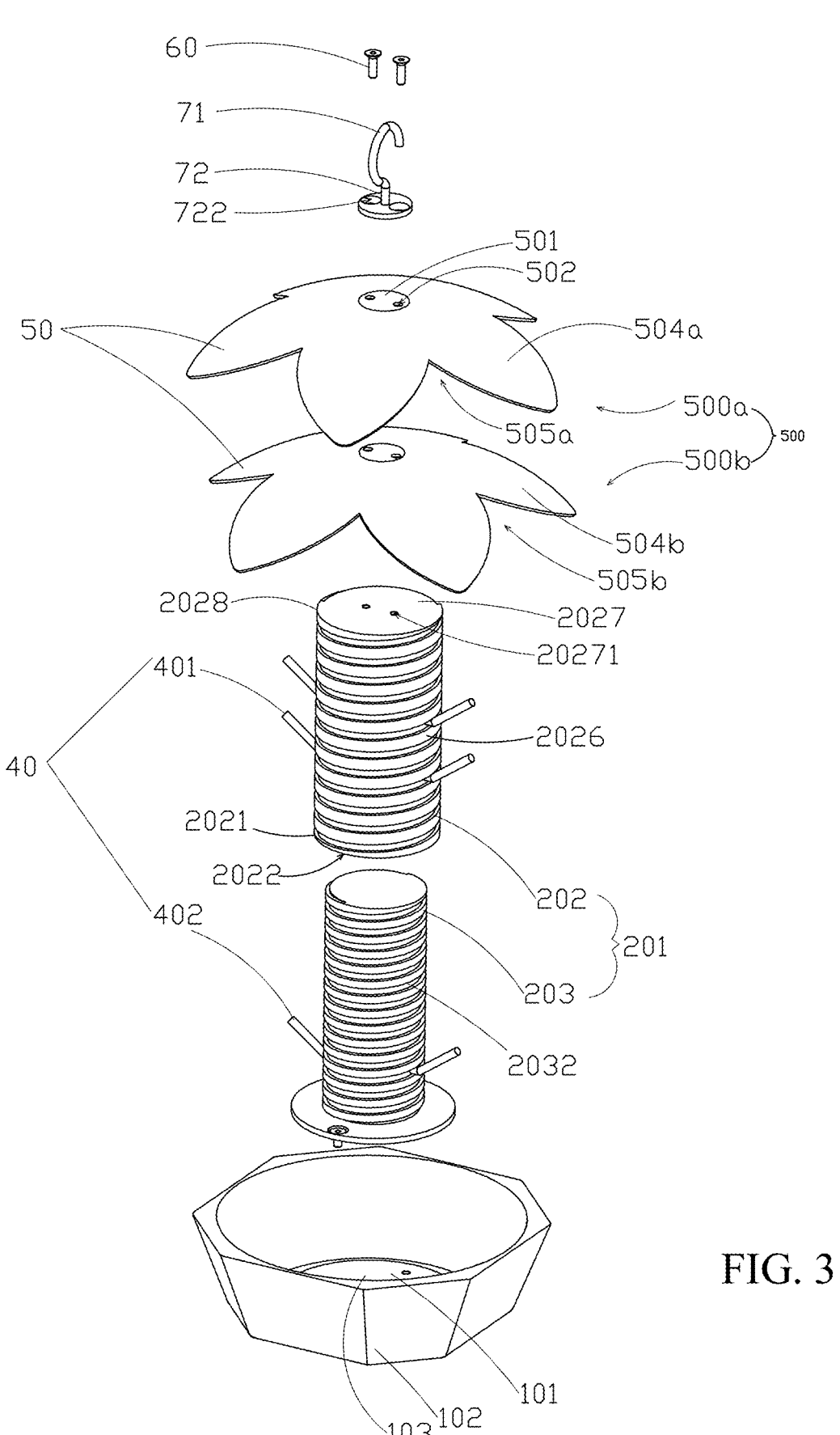
FIG. 3 is an exploded schematic structural view of the pet feeding dish of FIG. 1.
Figure 4:
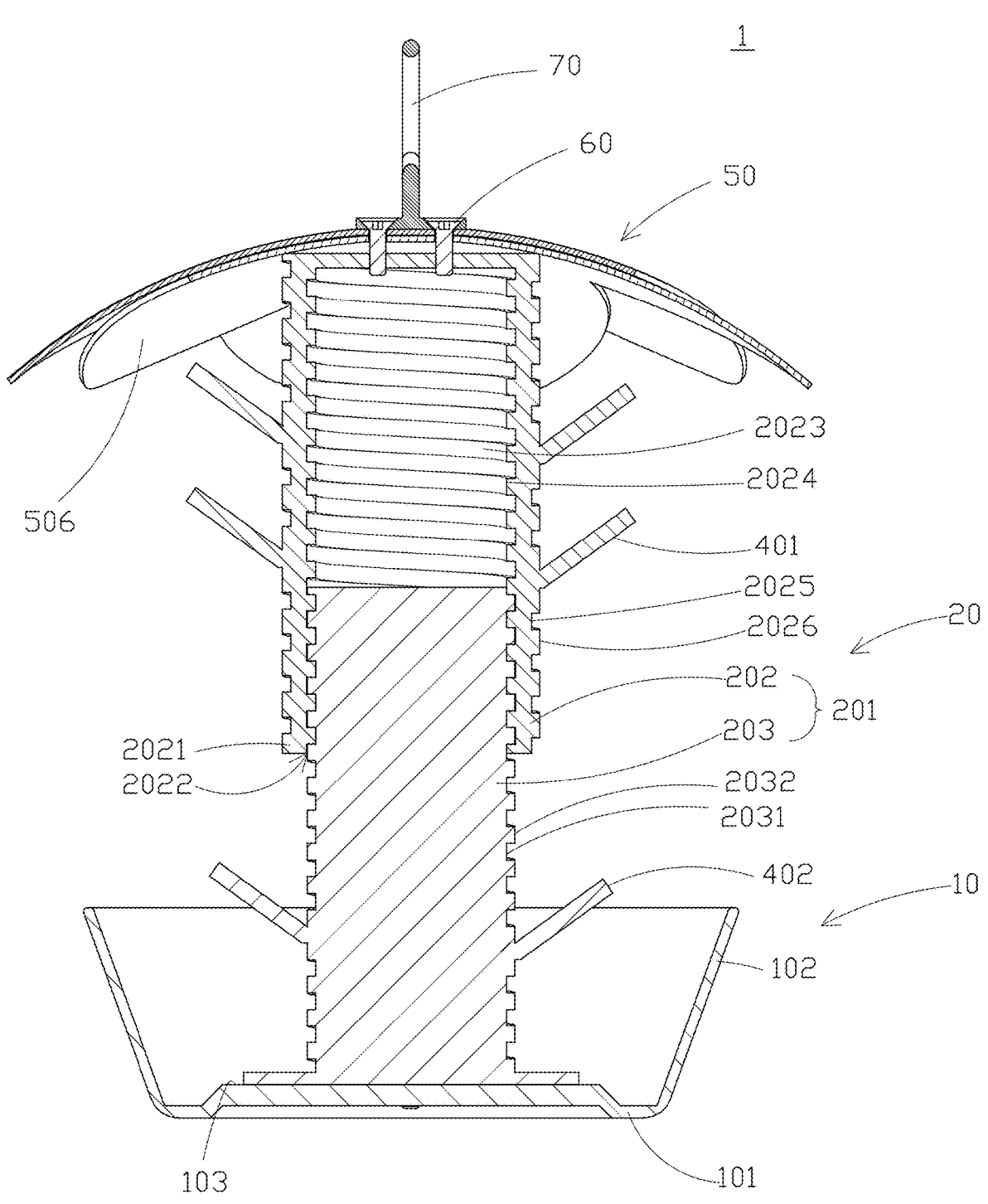
FIG. 4 is a sectional schematic structural view of the pet feeding dish along line A-A of FIG. 1.

Referring to FIG. 3, a hook 70 is further provided above the anti-escape umbrella-like structure 50, and the hook 70 facilitates the hanging of the pet feeding dish 1. In the present embodiment, the hook 70 includes a hook body 71 and a mounting base 72. The hook body 71 is molded onto the mounting base 72 or mounted on the mounting base 72. For example, in an embodiment, a threaded connection portion is provided at a lower end of the hook body 71, and a threaded hole is formed in the mounting base 72. The hook body 71 is mounted on the mounting base 72 through the cooperation between the threaded connection portion and the threaded hole. The mounting base 72 is further provided with threaded holes 722, which are aligned with the threaded holes 502 and the threaded holes 20271. Through the cooperation of the threaded connecting members 60 with the threaded holes 722, the threaded holes 502 as well as the threaded holes 20271, the hook 70, the anti-escape umbrella-like structure 50 and the upper climbing column 202 are assembled together.

Figure 12:
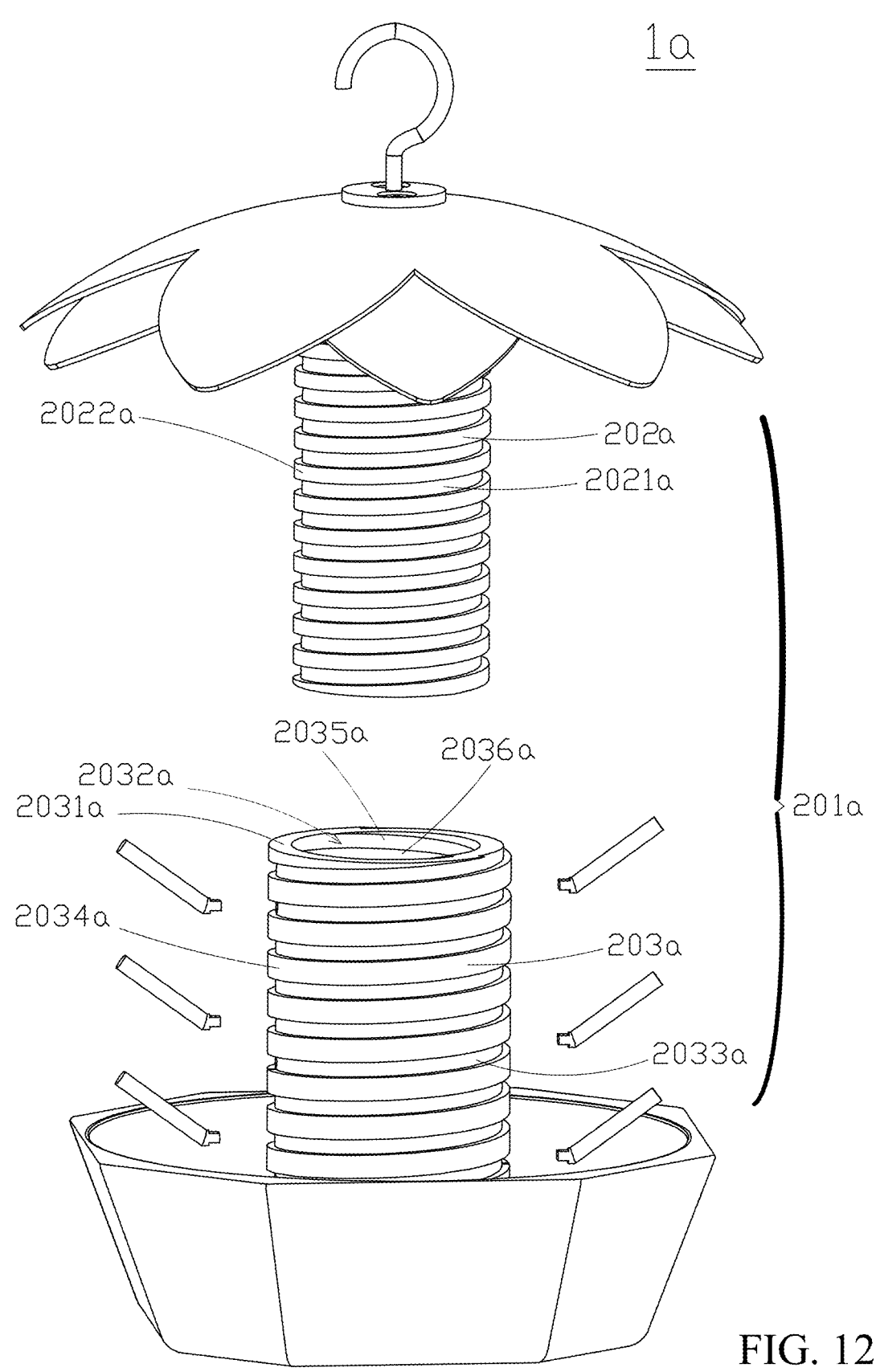
FIG. 12 is a schematic structural view of a pet feeding dish according to a ninth embodiment of the present application, with an upper climbing column separated from a lower climbing column and branch structures separated from the climbing columns.

Referring to FIG. 12, FIG. 12 is a schematic structural view of a pet feeding dish 1a according to a ninth embodiment of the present application. Different from the pet feeding dish 1 of the first embodiment, the pet feeding dish 1a of the ninth embodiment has an upper climbing column 202a with a smaller diameter and a lower climbing column 203a with a larger diameter. The lower climbing column 203a is a hollow cylindrical structure, and an opening 2032a is provided at its upper end 2031a. The lower climbing column 203a is sleeved on the upper climbing column 202a through the opening 2032a. An outer helical structure 2022a is provided on an outer side wall 2021a of the upper climbing column 202a, an outer helical structure 2034a is provided on an outer side wall 2033a of the lower climbing column 203a, and an inner helical structure 2036a is provided on an inner side wall 2035a of the lower climbing column 203a. Through the cooperation between the outer helical structure 2022a and the inner helical structure 2036a, the upper climbing column 202a and the lower climbing column 203a are detachably and movably assembled, so that the overall height of the climbing column 201a can be adjusted. For other structures of the pet feeding dish 1a, reference can be made to the pet feeding dish 1 of the first embodiment, which will not be repeated here.

Generally speaking, in the present application, first of all, by arranging a climbing member in the pet feeding dish, the activity space for small reptiles is expanded, the probability of the small reptiles crawling around inside the pet cage is reduced, and both the vitality of small reptiles and the environment are improved. Secondly, the height of the climbing member is adjustable, allowing the users to adjust the height of the climbing member according to the number of small reptiles or the size of the pet cage, which makes the application of the pet feeding dish more flexible. Furthermore, the arrangement of the branch structure(s) further expands the activity space of the small reptiles and further enhances the activity level of the small reptiles. Finally, an anti-escape umbrella-like structure is arranged at the top of the climbing member to prevent small reptiles with strong jumping ability from jumping out as much as possible. The anti-escape umbrella-like structure adopts a flower shape, which makes the overall appearance of the pet feeding dish more appealing.

In the description of the present application, unless otherwise clearly specified and defined, the terms "mounted" and "connected" shall be understood in a broad sense. For example, it may be a fixed connection, a detachable connection, or an integral connection; it may be a mechanical connection or an electrical connection; it may be a direct connection, or an indirect connection through an intermediate medium, and it may also mean the internal communication between two components. For those of ordinary skill in the art, the specific meanings of the above terms in the present application can be understood according to specific circumstances.

For those skilled in the art, it is obvious that the present application is not limited to the details of the above exemplary embodiments, and the present application can be implemented in other specific forms without departing from the spirit or essential characteristics of the present application. Therefore, the embodiments should be regarded as exemplary and non-restrictive. The scope of the present application is defined by the appended claims rather than the above description. Therefore, it is intended to include all changes that fall within the meaning and scope of the equivalent elements of the claims in the present application. Any reference signs in the claims shall not be regarded as limiting the claims involved.

In addition, it should be understood that although this specification is described in accordance with embodiments, not each embodiment only contains an independent technical solution. This way of describing the specification is only for the sake of clarity. Those skilled in the art should regard the specification as a whole, and the technical solutions in each embodiment can also be properly combined to form other embodiments that can be understood by those skilled in the art.

What is claimed is:

1. A pet feeding dish, comprising:
a feeder body; and
a climbing column standing in the feeder body, comprising:
an upper climbing column; and
a lower climbing column,
wherein the upper climbing column and the lower climbing column are movably assembled through helical structures to adjust a height of the climbing column.

2. The pet feeding dish according to claim 1, wherein,
each of the upper climbing column and the lower climbing column comprises an outer side wall provided with an outer helical structure; and
one of the upper climbing column and the lower climbing column comprises an inner side wall provided with an inner helical structure, and the inner helical structure is cooperated with the outer helical structure of the other of the upper climbing column and the lower climbing column.

3. The pet feeding dish according to claim 2, further comprising:
at least one branch structure extending outward from an outer side wall of the climbing column.

4. The pet feeding dish according to claim 3, wherein the at least one branch structure is integrally formed with the climbing column.

5. The pet feeding dish according to claim 3, wherein an end of each of the at least one branch structure is provided with a pair of clamping feet, a helical structure on the outer side wall of the climbing column defines a helical groove, at least one pair of clamping slots are formed on side walls of the helical groove, and each of the at least one branch structure is detachably mounted on the outer side wall of the climbing column through the cooperation of the pair of clamping feet and the at least one pair of clamping slots.

6. The pet feeding dish according to claim 3, wherein an end of each of the at least one branch structure is provided with a mounting block having a non-circular profile, the climbing column is provided with a non-circular mounting hole that matches the mounting block in both size and shape, and each of the at least one branch structure is detachably mounted on the outer side wall of the climbing column through the cooperation of the mounting block and the non-circular mounting hole.

7. The pet feeding dish according to claim 2, further comprising:
an anti-escape umbrella-like structure covering a top of the upper climbing column, comprising:
a top area; and
an edge area surrounding the top area, and extending outward and downward from the top area, wherein an outer edge of the edge area surrounds the outer side wall of the upper climbing column.

8. The pet feeding dish according to claim 7, wherein the anti-escape umbrella-like structure is fixedly connected to the top of the upper climbing column, a lower side of the anti-escape umbrella-like structure abutting against an entire outer edge of the top of the upper climbing column.

9. The pet feeding dish according to claim 8, wherein the anti-escape umbrella-like structure comprises an upper petal structure and a lower petal structure stacked in a staggered manner.

10. The pet feeding dish according to claim 9, wherein each of the upper petal structure and the lower petal structure comprises a top area and an edge area extending outward and downward from the top area.

11. The pet feeding dish according to claim 10, wherein the edge area of each of the upper petal structure and the lower petal structure includes a plurality of petal-shaped members, with a gap defined between every two adjacent petal-shaped members.

12. The pet feeding dish according to claim 11, wherein each petal-shaped member of the upper petal structure is aligned with a gap of the lower petal structure, and each gap of the upper petal structure is aligned with a petal-shaped member of the lower petal structure.

\* \* \* \* \*